United States Patent [19]

Violette et al.

[11] Patent Number: 5,022,825
[45] Date of Patent: Jun. 11, 1991

[54] PITCH RETENTION MEMBER

[75] Inventors: John A. Violette, Granby; David P. Nagle, Windsor Locks, both of Conn.

[73] Assignee: United Technologies Corporation, Hartford, Conn.

[21] Appl. No.: 255,100

[22] Filed: Oct. 7, 1988

[51] Int. Cl.[5] .......................................... F04D 29/66
[52] U.S. Cl. .................................. 416/500; 416/205; 416/248
[58] Field of Search .............. 416/220 R, 221, 134 R, 416/140 R, 147, 205, 209, 239, 141 R, 135 R, 248, 500

[56] References Cited

U.S. PATENT DOCUMENTS

| | | | |
|---|---|---|---|
| 961,328 | 6/1910 | Wait | 416/220 R |
| 1,802,648 | 4/1931 | Heath | 416/134 R |
| 1,863,387 | 6/1932 | Woolson | 416/207 |
| 1,927,592 | 9/1933 | Lambert | 416/147 |
| 2,317,338 | 4/1943 | Rydmark | 416/221 |
| 2,537,739 | 1/1951 | Chilton | 416/134 R |
| 2,559,131 | 7/1951 | Oestrich et al. | 416/92 |
| 2,595,829 | 5/1952 | Dean | 416/134 R |
| 2,648,391 | 8/1953 | Cushman et al. | 416/135 R |
| 2,651,494 | 9/1953 | Persson | 416/220 R |
| 2,656,146 | 10/1953 | Sollinger | 416/97 R |
| 2,658,718 | 11/1953 | Walker | 416/92 |
| 2,873,088 | 2/1959 | Neumann | 416/194 |
| 2,936,155 | 5/1960 | Howell et al. | 416/135 R |
| 2,990,018 | 6/1961 | Moore | 416/134 R |
| 3,039,739 | 6/1962 | Leland | 416/222 |
| 3,487,879 | 1/1970 | McCarthy et al. | 416/220 |
| 3,572,970 | 3/1971 | Smuland | 416/221 |
| 3,860,361 | 1/1975 | McMurtry et al. | 416/141 X |
| 3,870,434 | 3/1975 | Paulson | 416/147 |
| 4,037,990 | 7/1977 | Harris | 416/220 |
| 4,045,149 | 8/1977 | Ravenhall | 416/135 |
| 4,047,840 | 9/1977 | Ravenhall et al. | 416/135 |
| 4,626,169 | 12/1986 | Hsing et al. | 416/95 |
| 4,738,591 | 4/1988 | Butler | 416/158 X |
| 4,767,271 | 8/1988 | Catlow | 416/129 |

FOREIGN PATENT DOCUMENTS 1114820 9/1984 U.S.S.R. ............................ 416/207
980656 1/1965 United Kingdom.

OTHER PUBLICATIONS

Paper No. 66—WA/GT-4, Authors: J. I. Goatham and G. T. Smailes; "Some Vibration Characteristics of Pin--Fixed Compressor Blades"—pp. 1 through 11, Contributed by the Gas Turbine Division—presented at Winter Annual Meeting, New York, N.Y., 11/27-12/1/66.

Primary Examiner—John T. Kwon
Attorney, Agent, or Firm—Lloyd D. Doigan

[57] ABSTRACT

A pitch retention member rotatably mounts a propeller or fan hereto radially outwardly from a spinner or a hub. The member attaches to the blade of a pair of tenons, each tenon having a hole passing therethrough for receiving a pin about which the blade may rotate. The pitch retention member cooperates with a motion limiter provided at the base of the blade to: damp rotational movement of the blade about the pin to minimize blade angular excursions when centrifugal loads are low; improve high speed blade stability; moderate blade vibratory motion and tune out undesirable blade resonant frequencies; and, absorb force created by impact with foreign objects. Such impact is adsorbed at a desired threshold level of bending load of a crushable material disposed within the blade retention pitch member.

20 Claims, 1 Drawing Sheet

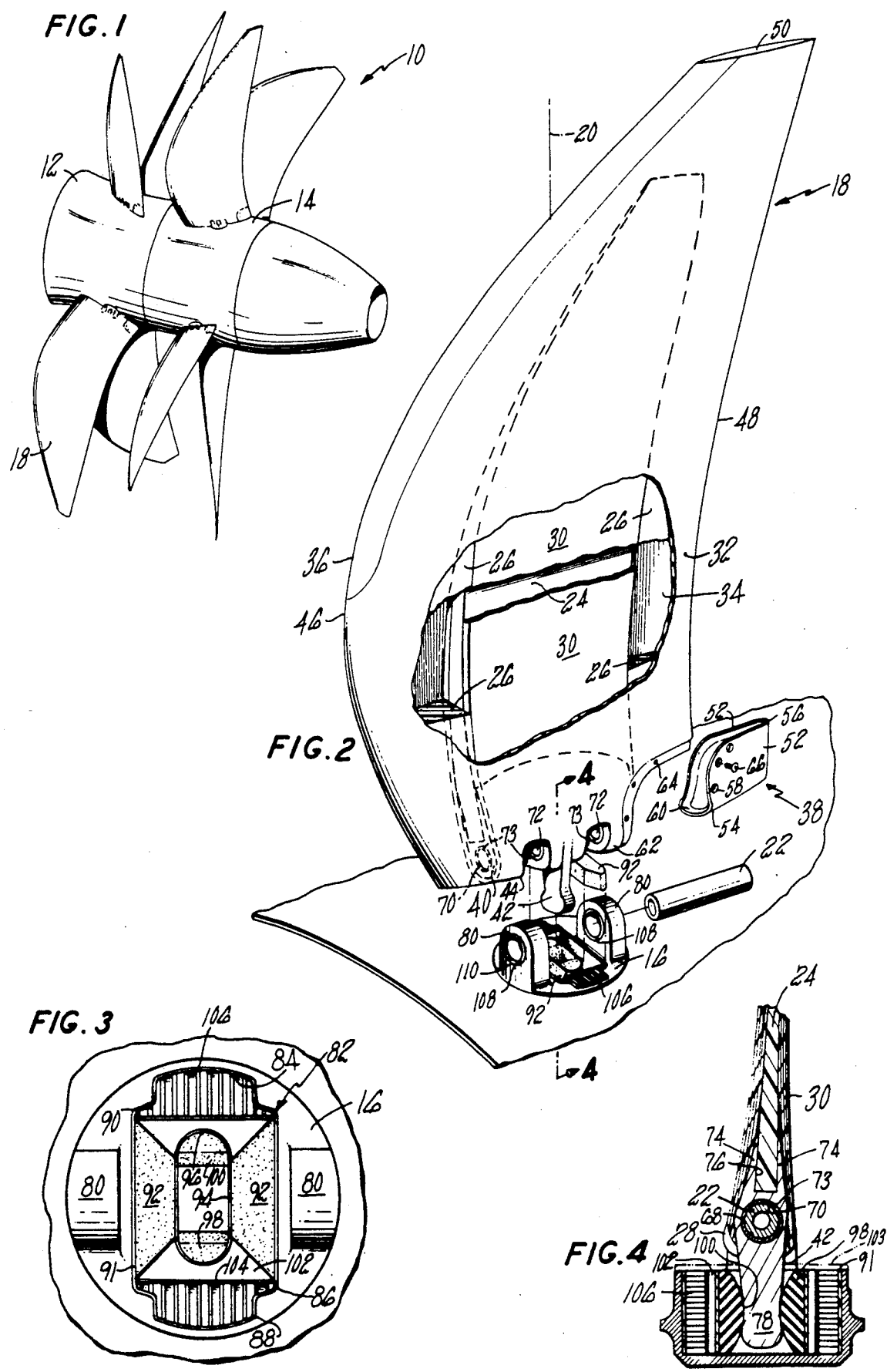

PITCH RETENTION MEMBER

CROSS REFERENCE TO RELATED APPLICATIONS

This invention described herein may employ some of the teachings disclosed and claimed in commonly owned copending applications filed on even date herewith by Violette et al, (Ser. No. 07/255,815), entitled "Pinned Airfoil Propeller Assembly"; by Violette et al, (Ser. No. 07/255,099), entitled "Pinned Airfoil Propeller Blade".

TECHNICAL FIELD

This invention relates to a pitch retention member for mounting a propeller blade to a hub.

BACKGROUND ART

Aircraft propeller blades are subject to damage from foreign objects such as sand, rain, hail, and birds etc. Propeller blades that are mounted towards the rear of an aircraft are particularly susceptible to foreign object damage. Runway debris, such as sand, runway markers, stones, ice, water, slush and segments of tire tread etc., may be kicked up into a plane of rotation of the blades. Collision between the foreign objects and the propeller blades may require the removal of the damaged blades from the propeller for repair.

Typically, propeller blades are mounted to a hub of a propeller by means of a pitch retention member. The member is rotatable within the hub to allow the pitch of the propeller blade mounted therein to be set as required. A spinner may enclose the hub and the member.

To replace a damaged blade, the spinner and/or the blade retention member and/or the hub may have to be disassembled. Because of the complexity of the disassembly (and subsequent reassembly), blade changes are time consuming, expensive and subject to error. The problem is multiplied by propellers which have a plurality of blades. Some counter-rotating prop-fan propellers may have as many as 18 blades.

In counter-rotation prop-fans, each blade is rather heavily loaded absorbing as much as 1000 horsepower of engine torque and developing as much as 1,500 pounds of engine thrust. Heavily loaded propeller blades are subject to high vibratory loads and stresses. Moreover because prop-fan blades are swept, they are subject to instability at high speed.

DISCLOSURE OF THE INVENTION

It is an object of the invention to provide a pitch retention member from which damaged propeller blades may be quickly and easily replaced.

It is a further object of the invention to increase the tolerance of propeller blades attached to the pitch retention member to foreign object damage.

It is a further object of the invention to reduce blade vibratory retention loads and stresses.

It is a further object of the invention to provide a pitch retention member that maximizes the stability of propeller blades mounted thereto and operating at higher speeds.

According to the invention, a pitch retention member has a propeller blade mounted thereto radially outwardly from a propeller spinner by means of a pin.

According to a feature of the invention, the pitch retention member rotatably mounts the blades thereto by means of a pair of tenons, each tenon having a hole passing therethrough for receiving the pin.

According to a further feature of the invention, the pitch retention member cooperates with a motion limiter provided at the base of the blade to damp rotational movement of the blade about the pin, to minimize blade angular excursions when centrifugal loads are low, to moderate blade vibratory motion, to tune out undesirable blade resonate frequencies, and to absorb force created by impact with foreign objects. Such impact is absorbed at a desired threshold level of bending load by means of a crushable material disposed within the blade retention pitch member. By mounting the propeller blade for rotation about the axis of the pin, the blade response to a vibratory excitation in the first mode of vibration is modified such that the twisting motion of the blade is minimized. High speed stability of the blade is enhanced thereby.

These and other objects, features and advantages of the present invention will become more apparent in light of the following detailed description of a best mode embodiment thereof, as illustrated in the accompanying drawing.

BRIEF DESCRIPTION OF THE DRAWINGS

FIG. 1 shows a perspective view of a counter-rotating prop-fan propeller incorporating an embodiment of the invention;

FIG. 2 shows a perspective view, partially broken away, and partially exploded, of an embodiment of a propeller blade assembly of FIG. 1;

FIG. 3 shows a top view of a pitch retention member of FIG. 2; and

FIG. 4 shows a cut away view of the assembly of FIG. 2 taken along the line 4—4.

BEST MODE FOR CARRYING OUT THE INVENTION

Referring to FIG. 1, a counter-rotating prop-fan propeller 10 which provides an environment for an embodiment of the invention is shown. Such a propeller 10 has a forward hub (not shown) covered by a first spinner 12, and an aft hub (not shown) covered by a second spinner 14. Each hub, as is known in the art, holds a pitch retention member 16 (see FIGS. 2 and 3). Each pitch retention member, in turn, has a blade 18 mounted thereto. Each blade may be rotated angularly about its longitudinal axis 20 by the blade pitch retention member to set the pitch of the blade as is well known in the art.

Referring to FIGS. 2 and 4, a best mode embodiment of the propeller blade of the invention is shown. The propeller blade is utilized in an assembly which has several major portions; the blade pitch retention member (hereinafter member) 16, the blade 18, and a retention pin 22.

THE BLADE

The blade 18 is comprised of: a spar formed of an insert 24, wrapping material 30 (see FIG. 4) and a spar root fairing 40 having an integral rotation limiter 42; a first filler material 26, a second filler material 28 (see FIG. 4), an airfoil shell having a first side 32 and a second side 34, a leading edge sheath 36, and a pin access panel 38. The blade has a root portion 44, a leading edge 46, a trailing edge 48 and a tip portion 50 as is well known in the art.

The insert 24 is constructed of a graphite epoxy, Kevlar ®, or fiberglass composite material (or the like)

and is shaped to approximate the internal geometry of both sides of the shell 32, 34 which, in turn, form final shape of the blade 18. The first filler material 26, which is a lightweight structural foam, provides structural integrity and shear strength to the leading and trail edge portions which overhang the spar. The second filler material 28, which is a pre-molded elastomeric material, is used to shape the root 40 as will be discussed infra. The spar wrapping material 30 is constructed of a pre-impregnated graphite tape, cloth or the like. The first side 32 and the second side 34 of the shell are constructed of fiberglass cloth or the like, filled with transfer molded resins as are known in the art. The leading edge sheath 36, which is constructed of an electroformed nickel, protects the leading edge 46 of the blade from erosion and foreign object damage.

The pin access panel 38, which is located at the root portion 44 and trailing edge 48 of the blade 18, is shaped generally to conform with the shape of the root edge and trailing edge thereof. The pin access panel has two aerodynamic side portions 52, a bottom portion 54, and a trailing portion 56.

The pin access panel has two or more holes 58 passing therethrough to allow pin access panel to be secured to the first side 32 of the shell. The pin access panel has an inner contour 60 which cooperates with an outer contour 62 of the first side 32 and second side 34 of the shell to ensure an aerodynamic profile of the blade 18. The holes 58 align with an equal number of threaded holes 64 (or bushings or the like) disposed within the first side 32 of the shell. Screws 66 secure the pin access panel to the shell.

The spar root fairing 40 is comprised of a body 68 having a hollow core 70, a pair of mortise sections 72 extending into the body, a pair of side portions 74 which extend upwardly from the body, a cavity 76 formed between the side portions for receiving the insert 24 (see FIG. 4), and the rotation limiter 42 extending downwardly from the body. A bushing 73 is disposed within the length of the hollow core 70. The side portions 74 taper in width and in length upwardly from the body so that the side portions fair into the spar when the cavity receives the insert 24 (see FIGS. 2 and 4).

The rotation limiter 42 tapers in width downwardly from the body portion (see FIG. 4) and then extends outwardly to form a bulbous portion 78. The bulbous portion helps retain the rotation limiter within the member 16 as will be discussed infra.

The blade 18 is of common spar and shell construction. The spar, comprised of the insert 24, the wrapping material 30, and the root fairing 40, forms the primary structure of the blade. The first side 32 and the second side 34 of the shell extend beyond the boundaries of the spar to form the external airfoil. Cavities formed between the first and second sides of the shell ar filled with the first filler material 26.

The spar is formed by first bonding the insert 24 to the spar root fairing 40 by means of an adhesive as is known in the art. The spar and root fairing are then used as a mandrel to wrap the wrapping material 30 therearound.

The second filler material 28 is appended to the wrapping material 30 by means of a silicon type adhesive. The second filler sections give the blade a profile at its root which prevents air from escaping between the root portion 44 of the blade and the spinner 12. The second filler shapes the root portion of the blade so that it fairs to the spinner 12 or 14 and so that it provides an aerodynamic shape in conjunction with the member 16, as will be discussed infra.

The spar and the first side 32 and second side 34 of the shell are bonded to each other along their mutual interface by means of an adhesive film. The insert is bonded to the spar root fairing by means of a similar adhesive film.

THE MEMBER

The member 16 is conventionally mounted within the hub for rotation to set the pitch of the blades as is well known in the art.

The member has a pair of tenons 80 for insertion in the mortise sections 72 of the spar root fairing 40. The sides of the tenons cooperate with the second filler material and the wraps of the root portion of the blade to form an efficient aerodynamic shape. The tenons each have an opening 110 in which a bushing 108 is mounted.

The member has an opening 82 in its center as seen in FIG. 3. The opening has four lobes 84, 86, 88, 90. A liner 91, which conforms to the shape of the opening, is slideably received within the lobes thereof. Each of a pair of first elastomeric members 92 is bonded conventionally to the liner 91 within one of an opposing first pair of lobes 86, 90.

Each elastomeric member is in turn conventionally bonded to an oblong, first metallic (or other deformable material) member 94. Bonded within each end 96 of the first metallic member is a second elastomeric member 98. As shown in FIG. 4, each second elastomeric member 98 has an arcuate cross-section 100. The arcuate cross-sections abut the bulbous end 78 of the rotation limiter 42.

A second metallic (or other deformable material) member 104 is attached to the liner 91 across each of lobes 84, 88. Bonded to the second metallic member and the liner 91 is a crushable material 106 such as a honeycomb. An air space 102 separates the first and second metallic members. The liner is slideably removable from its respective lobe for repair and replacement. The member may be enclosed by a removable cover 103 (shown in phantom in FIG. 4) which fairs into the spinner 12 or 14 to provide an aerodynamic profile at the root portion 44.

THE RETENTION PIN

The retention pin 22 is formed of a hollow cylinder. The diameter of the cylinder conforms to the inner diameter of the bushings 73, 108. The retention pin has an threaded interior portion (not shown). The threaded interior portion is designed to engage a threaded key (not shown) by which the pin may be withdrawn from the hollow core 70 of the fairing 40 and the openings 110 within the tenons 80.

ASSEMBLY

To construct the assembly, the rotation limiter 42 of the fairing 40 is inserted between the second elastomeric members 98 as the tenons 80 of the member 16 are inserted in mortise sections 72 of the fairing 40. When the holes 110 in the tenons align with the hollow core 70, the retention pin 22 is inserted therethrough. The holes 58 of the pin access panel 38 are aligned with the holes 64 in the first side of the shell. The pin access panel is then attached to the first side of the shell by screws 66.

If a blade is damaged and requires maintenance, the screws 66 holding the pin access panel 38 are removed so that access to the pin 22 is possible. The threads of the key (not shown) engage the pin. The pin is then removed by pulling the key. The blade may then be easily removed and replaced as above.

If a blade experiences impact from a foreign object, the impulsive energy of the impact will cause rotation of the blade about the pin. The impulsive energy is distributed through the rotation limiter across the second elastomeric members 98 in compression, across the first elastomeric members 92 in shear, and across the first and second metallic members to the crushable material. The crushable material is designed to crush if a threshold bending moment that would damage the blade is distributed across the air space 102 thereto. That is, the crushable material is designed to absorb a force of rotational motion exceeding a threshold bending moment limit upon the propeller or fan blade. On the other hand, the first and second elastomeric members and the first and second metallic members will resist the force of rotational motion below the threshold bending moment limit. Because the crushable material absorbs the force of the bending moment, the probability of damage to the blade is minimized. The second metallic member ensures that the force of the bending moment is evenly distributed across the crushable material. The liner makes it easier to slideably remove the crushable material mounted therein from its respective lobe.

In contrast to blades that may not rotate about a retention pin, rotation of the blade of the invention about the retention pin prevents the building of bending loads in the root portion of the composite portions of the spar thereby minimizing the probability of the fracture of relatively brittle composite portions. Blades that do not redistribute the bending moment caused by impacts must have root portions that are sized to withstand such bending moments. Such root portions become inordinately thick and are inefficient aerodynamically. Such inefficiency is particularly inappropriate in the prop fan environment where tip speeds of propeller blades may exceed Mach 1 and where flow between the blade root sections is accelerated due to a choking effect to speeds approaching Mach 1.

The composite insert and wraps provide several benefits. The finished blade is light weight. As a result, the pin 22 is able to reliably withstand the centrifugal loads placed thereon. A pin may not be able to withstand the loads of heavier blades. Also, the blades are strong enough to provide extended service and durability. Further, putting the pin in the blade allows the spar wrap material to overhang forward and aft of the retention tenons, thereby increasing the load capacity of the assembly.

The first and second elastomeric members resist the tendency of the blade to rotate about the pin in shear and compression as noted above. The durometer hardness and dimensions of the elastomeric used in the elastomeric members may be designed to tune out undesirable blade resonate frequencies, to reduce stress on the blade, and to minimize blade angular excursions when centrifugal loads are low.

The first mode of vibration in straight blades is characterized by a pure bending motion. Because of an overhanging tip mass, the first mode of vibration in swept blades is characterized by both a twisting motion and a bending motion. The twisting motion acts to magnify blade response to vibratory excitations produced by the distortions of the aerodynamic flow field through the propeller thereby leading to high speed instabilities. By mounting the propeller blade for rotation about the axis of the pin, the blade response to the vibratory excitation in the first mode of vibration is modified such that the twisting motion of the blade is minimized. The first mode of vibration in the swept blade of the invention is characterized by a more pure bending motion than an equivalent fixed root blade. High speed stability is enhanced thereby. Blades that twist torsionally require stiffening to withstand such torsional twist. By utilizing the pin assembly, thinner and shorter chord length blades, which are quieter and more efficient aerodynamically than the prior art, may be utilized. Further the stability of the swept blade is maximized with the blade being essentially free of flutter at blade tips speeds of about Mach 1.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention. For instance one of ordinary skill in the art would recognize the applicability of the invention to fan blades as well as propeller blades.

We claim:

1. A pitch member for rotatably mounting a propeller or fan blade to a hub, said propeller or fan blade having means depending therefrom for limiting rotation of said propeller or fan or fan blade about a root portion thereof, said member comprising;
   a opening for receiving said means for limiting rotation,
   first means disposed within said opening for resisting a force of rotational motion of said propeller or fan blade about said root portion thereof below a threshold bending moment limit upon said propeller or fan blade, and
   second means disposed within said opening for absorbing said force of rotational motion of said propeller or fan blade about said root portion thereof exceeding a threshold bending moment limit upon said propeller or fan blade.

2. The pitch member of claim 1 further comprising;
   a liner removably disposed within said opening and attaching to said first means and said second means such that said first and second means may be removed within said liner as required.

3. The pitch member of claim 1 wherein said opening comprises;
   a first and second pair of lobes, said first pair of lobes receiving said first means, said second pair of lobes housing said second means.

4. The pitch member of claim 3 wherein said first means comprises;
   a first elastomeric member disposed within one of said first pair of lobes, said first member resisting said force of rotation of said propeller or fan blade in shear,
   a first member attaching to said first elastomeric member, and
   a second elastomeric member disposed within said first member, said second elastomeric member resisting said force of rotation of said propeller or fan blade in compression.

5. The pitch member of claim 4 wherein said second means compromises;

a crushable means having a crushable material disposed within said second pair of lobes, said crushable means abutting said first member.

6. The pitch member of claim 1 wherein said first means comprises;
   a first elastomeric member disposed within said opening, said first member resisting said force of rotation of said propeller or fan blade in shear,
   a first member attaching to said first elastomeric member, and
   a second elastomeric member disposed within said first member, said second elastomeric member resisting said force of rotation of said propeller or fan blade in compression.

7. The pitch member of claim 6 wherein said second means compromises;
   a crushable means having a crushable material disposed within said opening, said crushable means abutting said first member.

8. The pitch member of claim 1 wherein said second means compromises;
   a crushable means having a crushable material disposed within said opening for absorbing said force of rotational motion of said propeller or fan blade about said root portion thereof exceeding a threshold bending moment limit upon said propeller or fan blade.

9. The pitch member of claim 8 wherein said first means comprises;
   a first elastomeric member disposed within said opening, said first member resisting said force of rotation of said propeller or fan blade in shear,
   a first member attaching to said first elastomeric member and abutting said crushable means, said first member transmitting said rotational force of said propeller or fan blade to said crushable material, and
   a second elastomeric member disposed within said first member, said second elastomeric member resisting said force of rotation of said propeller or fan blade in compression.

10. A pitch member for mounting a propeller or fan or fan blade to a hub to set a pitch of said propeller or fan blade, said propeller or fan blade having means depending therefrom for limiting rotation of said propeller or fan blade about a root portion thereof, said member comprising;
    a body,
    a opening within said body for receiving said means for limiting rotation,
    first means disposed within said opening for resisting a force of rotational motion of said propeller or fan blade about said root portion thereof below a threshold bending moment limit upon said propeller or fan blade,
    second means disposed within said opening for absorbing said force of rotational motion of said propeller or fan blade about said root portion thereof exceeding a threshold bending moment limit upon said propeller or fan blade, and
    means extending from said body for rotatably mounting said propeller or fan blade radially outwardly from said hub.

11. The pitch member of claim 10 further comprising;
    a liner removably disposed within said opening and attaching to said first means and said second means such that said first and second means may be removed with said liner as required.

12. The pitch member of claim 10 wherein said means extending from said body is characterized by a tenon.

13. The pitch member of claim 12 wherein said tenon is characterized by a hole passing therethrough for rotatably locking said blade to said tenon.

14. The pitch member of claim 13 wherein said opening comprises;
    a first and second pair of lobes, said first pair of lobes receiving said first means, said second pair of lobes housing said second means.

15. The pitch member of claim 14 wherein said first means comprises;
    a first elastomeric member disposed within one of said first pair of lobes, said first member resisting said force of rotation of said propeller or fan blade in shear, a first member attaching to said first elastomeric member, and
    a second elastomeric member disposed within said member, said second elastomeric member resisting first member, said second elastomeric member resisting said force of rotation of said propeller or fan blade in compression.

16. The pitch member of claim 15 wherein said second means compromises;
    a crushable means having a crushable material disposed within said second pair of lobes, said crushable means abutting said first member.

17. The pitch member of claim 10 wherein said first means comprises;
    a first elastomeric member disposed within said opening, said first member resisting said force of rotation of said propeller or fan blade in shear,
    a first member attaching to said first elastomeric member, and
    a second elastomeric member disposed within said first member, said second elastomeric member resisting said force of rotation of said propeller or fan blade in compression.

18. The pitch member of claim 17 wherein said second means compromises;
    a crushable means having a crushable material disposed within said opening, said crushable means abutting said first member.

19. The pitch member of claim 10 wherein said second means compromises;
    a crushable means having a crushable material disposed within said opening for absorbing said force of rotational motion of said propeller or fan blade exceeding said root portion thereof above a threshold bending moment limit upon said propeller or fan blade.

20. The pitch member of claim 19 wherein said first means comprises;
    a first elastomeric member disposed within said opening, said first member resisting said force of rotation of said propeller or fan blade in shear,
    a first member attaching to said first elastomeric member and abutting said crushable means, said first member transmitting said rotational force of said propeller or fan blade to said crushable material, and
    a second elastomeric member disposed within said first member, said second elastomeric member resisting said force of rotation of said propeller or fan blade in compression.

* * * * *